United States Patent [19]

Pickl, Jr.

[11] Patent Number: 5,692,539
[45] Date of Patent: Dec. 2, 1997

[54] CHECK VALVE FOR LIQUIDS

[76] Inventor: Joseph Pickl, Jr., 860 Colliston Rd., Ann Arbor, Mich. 48105

[21] Appl. No.: 417,683

[22] Filed: Apr. 6, 1995

[51] Int. Cl.$^6$ ................................................ F16K 15/00
[52] U.S. Cl. .......................... 137/543.19; 137/543.21; 251/368
[58] Field of Search .................. 137/540, 543.19, 137/543.21; 251/368, 367, 904

[56] References Cited

U.S. PATENT DOCUMENTS

| | | | |
|---|---|---|---|
| 2,223,994 | 12/1940 | Johnson | 137/543.21 |
| 3,086,544 | 4/1963 | Yost | 137/540 X |
| 4,147,184 | 4/1979 | Jess | 251/904 X |
| 4,628,959 | 12/1986 | Parker et al. | 251/368 X |
| 4,805,663 | 2/1989 | Szlaga | 137/540 X |
| 4,909,477 | 3/1990 | Heiman | 251/904 X |
| 5,092,361 | 3/1992 | Masuyama et al. | 251/368 X |
| 5,275,312 | 1/1994 | Labruzzo | 137/540 X |

*Primary Examiner*—Hoang Nguyen
*Attorney, Agent, or Firm*—Harness, Dickey & Pierce, P.L.C.

[57] ABSTRACT

A check valve for a liquid control system. The check valve includes a body member and a cap member which define an internal chamber that communicates an inlet tube with an outlet tube. Disposed within the chamber is a disc and a biasing means. The disc engages an annular valve seat formed in the the body member. This disc is biased by the biasing means to obstruct the inlet opening and close off the chamber from the inlet tube. The cap member also includes alignment members which position the biasing member and stop members which limit the displacement of the disc.

5 Claims, 1 Drawing Sheet

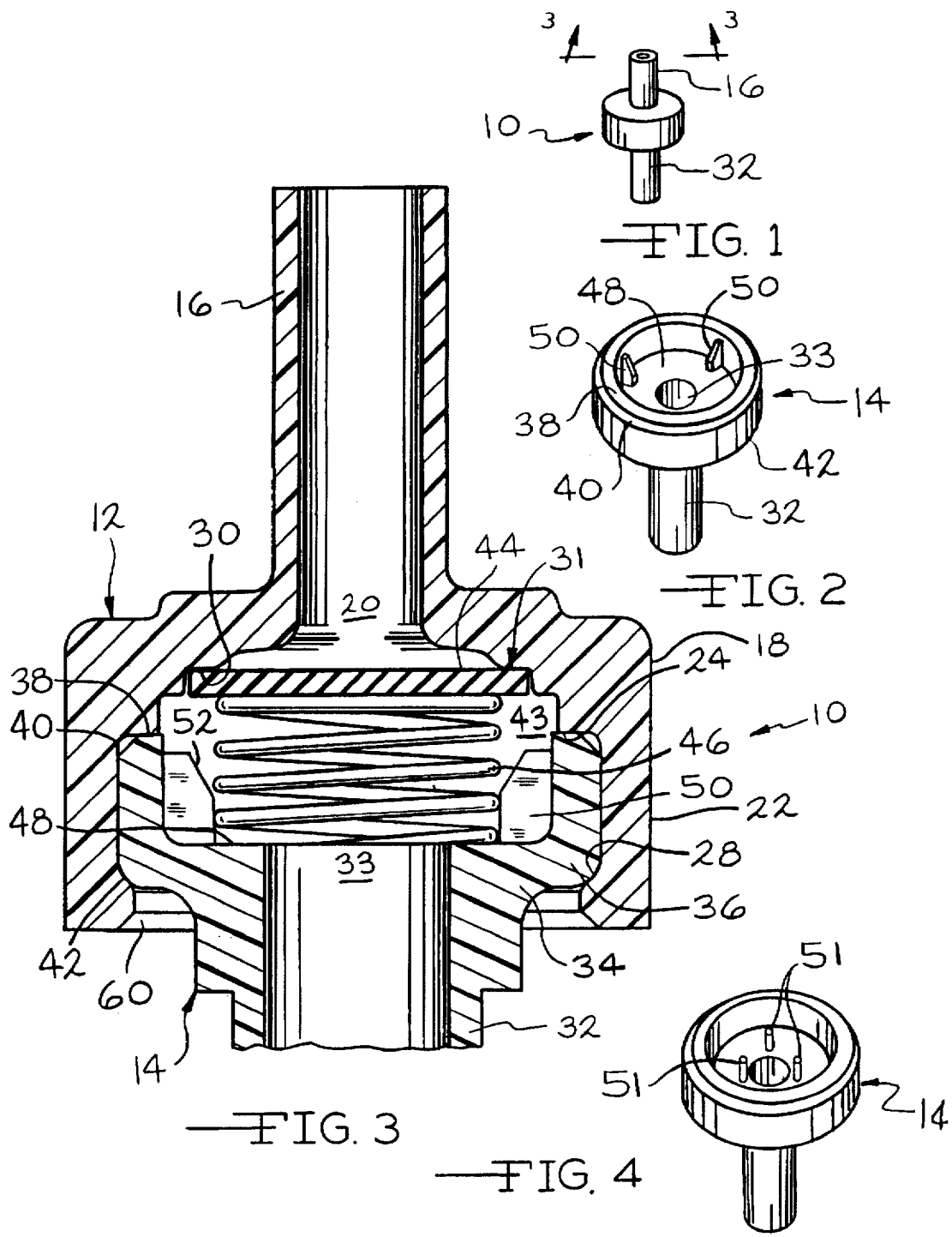

CHECK VALVE FOR LIQUIDS

BACKGROUND OF THE INVENTION

This invention relates generally to check valves and more particularly to a check valve consisting of two members assembled to form a valve chamber enclosing a biasing member and a disc which is in seating engagement with one of the chamber forming members. One chamber forming member includes an inlet tube portion and the other member includes an outlet tube portion, both in communication with the valve chamber.

Over the years, numerous types of check valves have been developed for various applications. The earlier check valves were assembled by a number of methods including sonic welding, spin welding, and solvent welding. However, these early check valves tended to exhibit faults including dimensional instabilities resulting from the assembly process, a single material requirement and inadequate sealing by the welding procedure.

A later generation of check valves saw the introduction of the press assembled check valve. These check valves included a resilient disc shaped elastomeric diaphragm seated within a valve chamber formed by press assembling two members together. A projection or abutment was provided integrally with one of the chamber forming members so that it would engage and deflect the center of the disc to increase the sealing engagement between the disc and the seating surface. In that the disc was resilient, fluid of an increased pressure from an inlet tube would cause the disc to flex about the abutment and disengage from the seating engagement at its periphery. In this manner, fluid would flow around the periphery of the disc and exit through the outlet tube. Check valve assemblies of this general type are shown in U.S. Pat. No. 4,762,149, issued Aug. 9, 1988 to applicant and in U.S. Pat. No. 3,889,710, issued Jun. 17, 1975 to Brost.

Under various conditions and applications, problems develop with the above mentioned check valves. One such condition is where the check valve is used in an application having a nozzle, in communication with the outlet side of the check valve, that is exposed to an air flow. The air flow over the nozzle will siphon out fluid located in-line between the valve and the nozzle. Once this fluid has been siphoned, the air flow induces a negative pressure on the outlet side of the valve, thereby disengaging the disc from the seating surface and causing fluid from the container to be siphoned or drained through the valve.

A second situation where unwanted drainage has been observed with the previous check valves is where the valve is employed in a tilted orientation or positioned below the source of fluid. In this application, the pressure exerted by the inlet side fluid can also cause the disc to become unseated thereby allowing drainage of the fluid. Such situations develop, for example, where the check valves are employed in moving vehicles or where the container is full of fluid.

With this in mind, it is an object of the present invention to overcome the above limitations by providing an easily controllable, one directional liquid flow by inducing a pressure differential between the inlet side of the valve chamber and the outlet side. Back flow of the liquid is prevented by the positive unidirectional biasing of the disc member, also known as the checking function of the valve. In so doing, the present invention includes a valve body and a valve cap, press assembled to form a valve chamber. A disc, preferably formed of rubber or an equivalent material, is enclosed within the chamber and is biased by a compression spring into engagement with a seat, formed by a raised shoulder, in the valve body.

Critical to the performance of a check valve is the integrity of the seal established between the two members forming the chamber. In the present invention, the valve body and valve cap coact so that, in final assembly, tubular portions of these members are in a generally telescoped engagement and provide sealing surfaces which extend completely around the periphery of the valve to ensure an airtight seal.

A further problem with the prior art designs involves the freezing of liquid within the check valve during extended periods of decreased temperature. Freezing generally has the effect of swelling the liquid, usually water mixed with another liquid to lower the temperature at which the mixture freezes, and causing the check valve to crack or break. Therefore, an additional object of the present invention is to avoid the problems caused by freezing and provide the assembly with a "give" which will avoid the breaking and cracking frequently seen in previous check valve assemblies.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a perspective view of a press assembled check valve embodying the principles of this invention;

FIG. 2 is a perspective view of a valve cap for use in the press assembled check valve of the present invention;

FIG. 3 is a longitudinal sectional view taken substantially along line 3—3 in FIG. 1 of a check valve embodying the principles of this invention; and FIG. 4 is a perspective view like FIG. 2 of a modified form of valve cap useable in the check valve of this invention.

DETAILED DESCRIPTION OF THE DRAWINGS

With reference to the drawing, the check valve, indicated generally as 10, is illustrated in FIG. 3 as including a valve body member 12 and a valve cap member 14. The valve body member 12 includes an integrally formed inlet tube 16 merging into a generally annular chamber forming portion 18 which is larger in diameter and generally concentric with the inlet tube portion 16. The interior of the inlet tube 16 communicates with the interior of the chamber forming portion 18 through an inlet opening 20 and enables fluid to flow into check valve 10.

The chamber forming portion 18 continues to extend axially in a generally tubular section 22 having radially spaced sealing surfaces 24 and 28 formed interiorly thereon. A generally annular seat or shoulder 30 is formed interiorly on the chamber forming portion 18 concentrically with the inlet opening 20 and, as further described below, functions as a valve seat 31 for a disc 44.

The valve cap member 14 is similarly constructed to the valve body member 12 and correspondingly includes an outlet tube portion 32. A chamber forming portion 34 is concentrically formed with the outlet tube 32. Having a diameter larger than the outlet tube 32, the interior of the chamber forming portion 34 communicates with the interior of the outlet tube 32 by way of an outlet opening 33 formed in the outlet tube 32. The outlet opening 33 thus allows fluid contained within a central chamber 43 of the check valve 10 to exit therefrom.

The chamber forming portion 34 extends axially from the outlet tube 32 and merges into a tubular section 36 having radially spaced sealing surfaces 38 and 42 and an inclined surface 40. The sealing surfaces 38 and 42 of the valve cap member 14 are correspondingly formed to respectively engage the sealing surfaces 24 and 28 of the valve body member 12. The coacting of the sealing surfaces 24, 28, 38 and 42 of the valve members 12 and 14, along with resilience of the material from which they are constructed, forms a circumferentially extending liquid and air-tight seal for the check valve 10.

When assembled together, as further described below, a chamber 43 is formed by the chamber forming portions 18 and 34. Disposed within the chamber 43 is a diaphragm or disc member 44. The disc 44 has a diameter that substantially corresponds to the valve seat 31 and is formed from rubber or other similar material. Also disposed within the chamber 43 is a positive biasing member 46, such as a spring or other biasing means, which urges the disc 44 into engagement with the valve seat 31. One end of the biasing member 46 engages a central portion of the disc 44 while the opposing end engages an interior surface 48 of the chamber forming portion 34 so as to circumscribe the outlet opening 33. While the preferred embodiment illustrates the biasing member 46 as being a compression spring, a variety of other biasing means might also be employed. The function of the biasing means is to apply a positive force to the disc 44 in opposition to the force of the liquid, in the inlet 16, on the disc 44. Any suitable means for applying such a force to the disc 44 is within the purview of this invention.

In a preferred embodiment, proper positioning of the spring member 46 within the valve cap member 14 is ensured by a plurality of positioning members 50 which are integrally formed on the interior surface 48 of the valve cap member 14. Four positioning members 50 are equidistantly spaced about the outlet opening 33. Each positioning member 50 is also spaced a radial distance from the outlet opening 33 and provides an area on the interior surface 48 of the chamber forming portion 34 in which the spring member 46 will sit. Additionally, the positioning members 50 extend both angularly and axially along the interior of the tubular section 36 forming inwardly angled surfaces 52 which locate the spring 46.

In certain applications, such as when the cap member 14 is above the body member 12, an alternate biasing means which can be used to provide the positive opposition pressure on the outlet 32 side of the disc 44 is a head of liquid. The amount of head pressure provided need not be substantial, only sufficient to urge the disc 44 into engagement with the valve seat 31 when liquid flow through the valve 10 is not desired. To prevent the disc 44 from obstructing the outlet opening 33 during liquid flow, cap 14 is constructed as shown in FIG. 4, with a plurality of stop members 51 (illustrated as being three in number) which are spaced outwardly from the opening 33 and are generally parallel to the outlet tube 32. The stop 51 will engage the perimeter of the disc 44 and maintain the disc 44 in a spaced relationship with the outlet opening 33. For this reason, the diameter of the disc 44 must be greater than the innermost diameter defined by the stop members 51. In this embodiment, variously shaped stop members 51 may be employed with the valve 10 so long as the characteristic of preventing the obstruction of outlet opening 33 is maintained. For example, a number of axially extending posts might be equidistantly positioned around the opening 33.

In assembling the check valve 10, the valve cap member 14 is held in a substantially upright position and the spring member 46 is positioned within the tubular section 36. The inwardly angled surfaces 52 of the positioning members 50 direct the spring member 46 into proper alignment onto the interior surface 48 around the outlet opening 33. The disc 44 is then centered into position on the remaining end of spring member 46. Once final assembly has been completed, the perimeter of the disc 44 is biased into engagement with the valve seat 31 and the disc 44 obstructs the passage of liquid from the inlet opening 20 of the inlet tube 16.

During final assembly, the tubular section 36 of the valve cap member 14 is press fit into engagement with the tubular section 22 of the valve body member 12. The exterior dimension of the tubular section 36 of the valve cap member 14 is greater than the interior dimension of the tubular section 22 of the valve body member 12. Thus, during insertion, the tubular section 22 is radially flexed to accept the increased dimension of the tubular section 36 of the valve cap member 14. Insertion is stopped at a point where the sealing surfaces 24 and 28 of the tubular section 22 are sealingly engaged with the sealing surfaces 38 and 42 of the tubular section 36. The innermost sealing surfaces 24 and 38, being transverse to the axis of insertion, coact as stop members to prevent over insertion of the valve cap member 14 and possible damage to the disc 44 and spring member 46.

During insertion of the valve cap member 14 into the valve body member 12, the inclined surface 40 on the inner end of the cap member 14 contacts and slidably engages a radially inwardly inclined lip 60 on the terminal end of the tubular section 22. As previously mentioned, the tubular section 22 flexes radially outward and, upon full insertion of the valve cap member 14, the lip 60 snaps over the tubular section 36 to retentively secure the check valve 10 in its assembled state.

When installed in a liquid control system, a first conduit is connected to the inlet tube 16 of the check valve 10. If the conduit is a resilient material, such as rubber tubing or the like, and has an inner diameter less than the outer diameter of the inlet tube 16, a frictional engagement will be sufficient to retentively secure one upon the other. Similarly, a second conduit is secured over the outlet tube 32.

By way of example and not limitation, the first conduit may lead from a windshield washer fluid reservoir to an in-line pumping means and then to the inlet tube 16 of the check valve 10. The second conduit might then be connected to a spray nozzle directed at the windshield. The pumping means will supply liquid to the inlet tube portion 16 at a pressure greater than that existing in the outlet tube portion 32. Upon a sufficient pressure being established, the disc 44 will be axially displaced compressing the spring member 46 toward the outlet opening 33. By providing the spring member 46 with known preload, control over the flow rates of liquid can be achieved by varying the pressure at which the liquid is provided.

Flow through the check valve 10 is continuous so long as the inlet tube 16 pressure is sufficient to displace the disc 44. For example, when the disc 44 is fully displaced and spaced by the positioning members 50, liquid will travel over the perimeter of the disc 44, through the gaps between the perimeter of the disc 44 and the interior surface of the tubular section 36 and out through the outlet opening 33. Liquid flow in the reverse direction is checked because the disc 44 moves into engagement with the valve seat 31 thereby obstructing the inlet opening 20. This checking function is induced because of the urging of the disc 44 by the biasing means 46, the force of the reversed fluid flow and the pressure differential that would be exhibited across the check valve 10 during such reversed fluid flow.

The valve body member 12 and the valve cap member 14 are preferably formed of a semi-rigid plastic material exhibiting some elastic properties. Thus, in addition to allowing the lip 60 to snap over the tubular section 36 of the valve cap member 14, the resiliency of the valve body member 12 and the valve cap member 14 enable the present invention to exhibit a "give" once assembled. This "give" is sufficient to accommodate the swelling effects of a freezing or frozen liquid without breaking, cracking or exhibiting other characteristics of failure. Various well known plastic or rubber materials and the like are commercially available for these purposes. Also, the valve cap member 14 and the valve body member 12 may be formed of different materials since there is no requirement with the check valve 10 of the present invention that they be formed of the same material.

While the above description constitutes the preferred embodiment of the present invention, it will be appreciated that the invention is susceptible to modification, variation and change without departing from the proper scope and fair meaning of the accompanying claims.

I claim:

1. A check valve for use in a liquid control system having conduits, said check valve comprising:
    a body member having an inlet tube adapted for connection to a conduit of the control system, a chamber forming portion of an increased size formed at one end of said inlet tube and being substantially concentric with said inlet tube, said chamber forming portion also having an inlet opening for communication with said inlet tube and a generally annular shoulder integrally formed therein at a position encircling said inlet opening, said chamber forming portion extending axially in a generally hollow, radially outward tubular section having an interior surface including radially spaced sealing surfaces circumscribing the interior periphery of said body;
    a cap member having an outlet tube adapted for connection to a conduit of the control system, a chamber forming portion of an increased size formed at one end of said outlet tube and including an outlet opening permitting communication therebetween, said chamber forming portion extending axially in a generally hollow, radially inward tubular section having an exterior surface including radially spaced sealing surfaces circumscribing the exterior periphery of said cap, a plurality of angularly spaced and radially extending members positioned substantially equidistantly around said forming chamber forming portion and said outlet opening;
    said outward and inward tubular sections being in press fit engagement one within the other such that said sealing surfaces are sealingly engaged and said chamber forming sections thereby form a valve chamber in communication with said inlet tube and said outlet tube;
    a substantially flat disc member transversely positioned within said valve chamber and being of a size corresponding to said shoulder, said disc engaging said shoulder to substantially obstruct said inlet opening and thereby seal off said valve chamber from liquid in said inlet tube portion, said members being engageable with said disc member for preventing obstruction of said outlet opening by said disc member; and
    biasing means located within said valve chamber for providing a force on said disc in a direction urging said disc into seated engagement with said shoulder in opposition to the force of liquid pressure in said inlet tube on said disc thereby obstructing said inlet opening, said biasing means being a compression coil spring and being aligned about said outlet opening by said inwardly angled surfaces.

2. A check valve as set forth in claim 1 wherein said outward tubular section includes one sealing surface forming a transverse stop member and another sealing surface forming a radially inwardly directed lip, said lip being snapped over said inward tubular section upon full insertion and said sealing surfaces of said outward tubular section exerting an axially compressive load on said sealing surfaces of said inward tubular section causing a liquid and air-tight sealing engagement therebetween.

3. A check valve as set forth in claim 1 wherein said cap member includes projecting members engageable with said disc member for preventing the obstruction of said outlet opening by said disc.

4. A check valve as set forth in claim 1 wherein said biasing means is a compression coil spring and said radially inward tubular section includes a plurality of angularly spaced and radially extending members positioned substantially equidistantly around said valve chamber, said positioning member having inwardly angled radial surfaces for aligning said spring with said disc member.

5. A check valve as set forth in claim 1 wherein said body member and said cap member are formed of a semi-rigid material exhibiting some elastic properties so as to be resiliently deflectable and wherein said sealing surfaces are maintained in engagement during deflection.

* * * * *